(12) United States Patent
Welsh et al.

(10) Patent No.: US 10,543,912 B2
(45) Date of Patent: Jan. 28, 2020

(54) HIGHER HARMONIC CONTROL AUGMENTED WITH ACTIVE VIBRATION CONTROL

(71) Applicant: Sikorsky Aircraft Corporation, Stratford, CT (US)

(72) Inventors: William A. Welsh, North Haven, CT (US); Vineet Sahasrabudhe, Cheshire, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 16/036,581

(22) Filed: Jul. 16, 2018

(65) Prior Publication Data
US 2019/0023382 A1 Jan. 24, 2019

Related U.S. Application Data

(60) Provisional application No. 62/534,335, filed on Jul. 19, 2017.

(51) Int. Cl.
*B64C 27/00* (2006.01)
*B64C 27/605* (2006.01)
*B64C 27/10* (2006.01)

(52) U.S. Cl.
CPC ............ *B64C 27/001* (2013.01); *B64C 27/10* (2013.01); *B64C 27/605* (2013.01); *B64C 2027/004* (2013.01)

(58) Field of Classification Search
None
See application file for complete search history.

(56) References Cited

U.S. PATENT DOCUMENTS

| 4,946,354 A | 8/1990 | Aubry et al. |
| 5,219,143 A | 6/1993 | Staple et al. |
| 5,655,878 A | 8/1997 | Yamakawa et al. |

(Continued)

FOREIGN PATENT DOCUMENTS

| EP | 2803570 A1 | 11/2014 |
| EP | 3150489 A1 | 4/2017 |

(Continued)

OTHER PUBLICATIONS

EP Communication pursuant to Article 94(3) EPC; Application No. 14 165 206.5-1754; dated May 17, 2016; pp. 1-5.

(Continued)

*Primary Examiner* — Thomas G Black
*Assistant Examiner* — Demetra R Smith-Stewart
(74) *Attorney, Agent, or Firm* — Cantor Colburn LLP

(57) ABSTRACT

A rotary wing aircraft includes a rotor system rotatable about an axis relative to an airframe. A plurality of blade assemblies is mounted to the rotor system. A higher harmonic control system is operable to generate a harmonic load at the rotor system according to a higher harmonic control signal. An active vibration control system is operable to generate vibration forces about the aircraft according to an active vibration control signal. A controller is operable to issue the higher harmonic control signal and the active vibration control signal to coordinate the higher harmonic control system and the active vibration control system to reduce vibration within the airframe.

14 Claims, 6 Drawing Sheets

(56) References Cited

U.S. PATENT DOCUMENTS

| | | | |
|---|---|---|---|
| 7,648,338 | B1 | 1/2010 | Welsh |
| 7,900,869 | B2 | 3/2011 | Keßler et al. |
| 8,197,205 | B2 | 6/2012 | Rudley et al. |
| 8,235,324 | B1 | 8/2012 | Birch et al. |
| 8,499,907 | B2 | 8/2013 | Smith et al. |
| 2003/0060903 | A1 | 3/2003 | MacMartin et al. |
| 2009/0269199 | A1 | 10/2009 | Rudley et al. |
| 2010/0003133 | A1* | 1/2010 | Welsh ............... B64C 27/001 416/1 |
| 2010/0150719 | A1 | 6/2010 | Waide et al. |
| 2012/0181379 | A1 | 7/2012 | Eller et al. |
| 2012/0292434 | A1 | 11/2012 | Welsh |
| 2013/0119187 | A1* | 5/2013 | Germanetti ............ F01D 7/00 244/17.25 |
| 2014/0314563 | A1* | 10/2014 | Mayrides ............ B64C 27/72 416/1 |
| 2015/0203196 | A1* | 7/2015 | Heverly, II ......... B64C 27/001 701/3 |
| 2016/0236773 | A1* | 8/2016 | Jolly .................. B64C 27/001 |
| 2017/0267338 | A1* | 9/2017 | Garcia ............... B64C 27/10 |
| 2018/0265186 | A1* | 9/2018 | Foskey .............. B64C 27/001 |

FOREIGN PATENT DOCUMENTS

| | | |
|---|---|---|
| WO | 2008033884 A2 | 3/2008 |
| WO | 2012076705 A2 | 6/2012 |
| WO | 2014022910 A1 | 2/2014 |

OTHER PUBLICATIONS

EP Communication; Extended European Search Report; Application No. 14165206.5-1754; dated Oct. 16, 2014, pp. 1-8.

Uwe T.P. Arnold, "Development of an Integrated Electrical Swashplateless Primary and Individual Blade Control System," Cheeseman Award Paper, Sep. 2006, pp. 1-14.

J. O'Leary, et al., "Design of Higher Harmonic Control for the ABC," Presented at the American Helicopter Soceity Mideast Region National Specialists' Meeting on Rotor System Design, hiladelphia, Oct. 22-24, 1980, Published Jan. 1982, pp. 1-6.

Thomas R. Norman, et al., "Full-Scale Wind Tunnel Test of a UH-60 Individual Blade Control System for Performance Improvement and Vibration, Loads, and Noise Control," Presented at Forum 65, Sikorsky AHS Online Store: The Vertical Flight Library, May 27, 2009, pp. 1-20.

U.T.P. Arnold, "Certification, Ground and Flight Testing of an Experimental IBC System for the CH-53G Helicopter," AHS Online Store: The Vertical Flight Library, Jun. 11, 2002, pp. 1-12.

D. Patt, et al., "The HHC Algorithm for Helicopter Vibration Reduction Revisited", 45th AIAA/ASME/ASCE/AHS/ASC Structures, Structural Dynamics & Materials Conference, Apr. 19-22, 2004 (29 pp.).

EPO Machine Translation; International Publication No. 2012076705 (A1); Publication Date: Jun. 14, 2012; 6 Pages.

European Patent Office, Extended European Search Report for Application No. 18184087.7-1010, dated Nov. 13, 2018 (10 pp.).

Friedmann, Peretz P., et al., "Vibration Reduction in Rotorcraft Using Active Control: A Comparison of Various Approaches", Journal of Guidance, Control, and Dynamics, vol. 18, No. 4, Jul.-Aug. 1995 (10 pp.).

* cited by examiner

HIGHER HARMONIC CONTROL AUGMENTED WITH ACTIVE VIBRATION CONTROL

CROSS-REFERENCE TO RELATED APPLICATIONS

This application claims the benefit of U.S. Provisional Application Ser. No. 62/534,335, filed Jul. 19, 2017, which is incorporated herein by reference in its entirety.

BACKGROUND OF THE INVENTION

Exemplary embodiments of the invention generally relate to a rotary wing aircraft, and more particularly, to a vibration control or suppression system in a rotary wing aircraft.

Rotary wing aircraft, or rotorcraft, can generate significant vibratory responses during operation. The primary source of such vibration is that generated by the main rotor system rotating at the blade passing frequency and the periodic loads acting on the rotor blades. Forces and moments are transmitted through the gearbox into the airframe, resulting in airframe vibration.

Active vibration control (AVC) systems that are characterized by anti-vibration actuators mounted in the fuselage or on or very near the helicopter main transmission to suppress otherwise high levels of vibration are often heavier than desirable, resulting in a reduced payload of the aircraft. For systems intended to generally completely suppress the aircraft vibration, six or more anti-vibration actuators, typically the heaviest components in AVC systems, are required. Thus it is desirable to reduce the weight and number of AVC actuators.

For rotor-based anti-vibration systems, the corresponding rotor-based actuators are typically oscillated at frequencies of the fuselage or other vibrations to be suppressed. In general, rotor-based systems cannot totally suppress all of the vibratory loads originating from the main rotor(s) either because the number of distinct load directions is greater than the number of controls or because the power or amplitude needed to provide complete suppression of the vibration by the rotor-based system alone is onerous. Also, the rotor-based system might be tasked with improving rotor efficiency or some other attribute and not tasked with reducing vibration. As a result, the residual vibration may thus "leak" into the airframe and cause unwanted vibration.

BRIEF DESCRIPTION OF THE INVENTION

According to an embodiment of the invention, a rotary wing aircraft includes a rotor system rotatable about an axis relative to an airframe. A plurality of blade assemblies is mounted to the rotor system. A higher harmonic control system is operable to generate a harmonic load at the rotor system according to a higher harmonic control signal. An active vibration control system is operable to generate vibration forces about the aircraft according to an active vibration control signal. A controller is operable to issue the higher harmonic control signal and the active vibration control signal to coordinate the higher harmonic control system and the active vibration control system to reduce vibration within the airframe.

In addition to one or more of the features described above, or as an alternative, in further embodiments the higher harmonic control system includes at least one computer coupled to at least one actuator, the at least one computer being operable to receive the higher harmonic control signal from the controller and operate the actuator in response to the higher harmonic control signal.

In addition to one or more of the features described above, or as an alternative, in further embodiments the at least one computer includes a plurality of computers for providing redundancy.

In addition to one or more of the features described above, or as an alternative, in further embodiments the at least one computer provides closed loop control of the at least one actuator.

In addition to one or more of the features described above, or as an alternative, in further embodiments the active vibration control system includes an electrical or wireless link coupled to at least one force generator, the link being operable to control at least one of phase and magnitude characteristics of the at least one force generator in response to the active vibration control signal from the controller.

According to another embodiment, a rotary wing aircraft includes a rotor system rotatable about an axis relative to an airframe and a plurality of blade assemblies mounted to the rotor system. An actuator system including a plurality of individually controllable actuators is movably coupled to the plurality of blade assemblies in an X-Y-Z axis. At least one force generator is mounted about the aircraft and a sensor system is positioned within the airframe. A controller is arranged in communication with the sensor system. The controller is operable to generate commands for the actuator system and the at least one force generator in response to the sensed vibration from the sensor system such that the actuator system and the at least one force generator in combination to reduce vibration within the airframe.

In addition to one or more of the features described above, or as an alternative, in further embodiments comprising a swashplate and the actuator system further comprises a plurality of actuators that control the fore-aft, left-right, and up-down movement of said swashplate, the controller being operable to generate commands for at least one of the actuators to control the movement of the swashplate to reduce vibration within the airframe.

In addition to one or more of the features described above, or as an alternative, in further embodiments the actuator system further comprises a plurality of actuators, each actuator being associated with one of the plurality of blade assemblies and being operable to independently control movement of a coupled blade assembly about a pitch axis, the controller being operable to generate commands for at least one of the actuators to control movement of at least one blade assembly to reduce vibration within the airframe.

In addition to one or more of the features described above, or as an alternative, in further embodiments the rotor system comprises a dual, counter-rotating, coaxial rotor system having an upper rotor system and a lower rotor system rotatable about a common axis relative to an airframe.

In addition to one or more of the features described above, or as an alternative, in further embodiments the actuator system includes a plurality of individually controllable actuators associated with the upper rotor system and a plurality of individually controllable actuators associated with the lower rotor system.

In addition to one or more of the features described above, or as an alternative, in further embodiments the upper rotor system and the lower rotor system each generate six unique vibratory loads such that the counter-rotating, coaxial rotor system generates twelve vibratory hub loads, and the twelve vibratory hub loads combine in the counter-rotating, coaxial rotor system to yield six net vibratory loads applied to the airframe, and the at least one computer individually controls at least one actuator coupled to the upper rotor system and at least one actuator coupled to the lower rotor system to reduce the six net vibratory loads.

According to yet another embodiment, a method of reducing vibration in a rotary wing aircraft airframe having a rotor system rotatable about an axis of rotation includes sensing vibrations of the airframe, individually controlling at least one actuator to adjust a position of the rotor system in an X-Y-Z axis to reduce vibration within the airframe of the aircraft according to the sensed vibration, and controlling at least one force generator mounted about the airframe to further reduce vibration within the airframe of the aircraft according to the sensed vibration.

In addition to one or more of the features described above, or as an alternative, in further embodiments the rotor system is a dual, counter-rotating, coaxial rotor system having an upper rotor system and a lower rotor system rotatable about a common axis of rotation.

In addition to one or more of the features described above, or as an alternative, in further embodiments including individually controlling at least one actuator to control the rotor system in an X-Y-Z axis includes: individually controlling at least one individually controllable actuator in each axis to control an upper swashplate and control an upper rotor system in said X-Y-Z axis with an upper higher harmonic control actuator system to reduce vibration within an airframe of the aircraft; and individually controlling a lower higher harmonic control actuator system which includes at least one individually controllable actuator in each axis to control a lower swashplate and control a lower rotor system in said X-Y-Z axis with a lower higher harmonic control actuator system to reduce vibration within the airframe of the aircraft.

In addition to one or more of the features described above, or as an alternative, in further embodiments wherein individually controlling at least one actuator to control the rotor system in an X-Y-Z axis includes individually controlling at least one actuator of a plurality of actuators, each of which is coupled to a blade assembly of the upper rotor system to control the upper rotor system in an X-Y-Z axis and to reduce vibration within an airframe of the aircraft; and individually controlling at least one actuator of a plurality of actuators, each of which is coupled to a blade assembly of the lower rotor system to control the lower rotor system in an X-Y-Z axis and to reduce vibration within an airframe of the aircraft.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
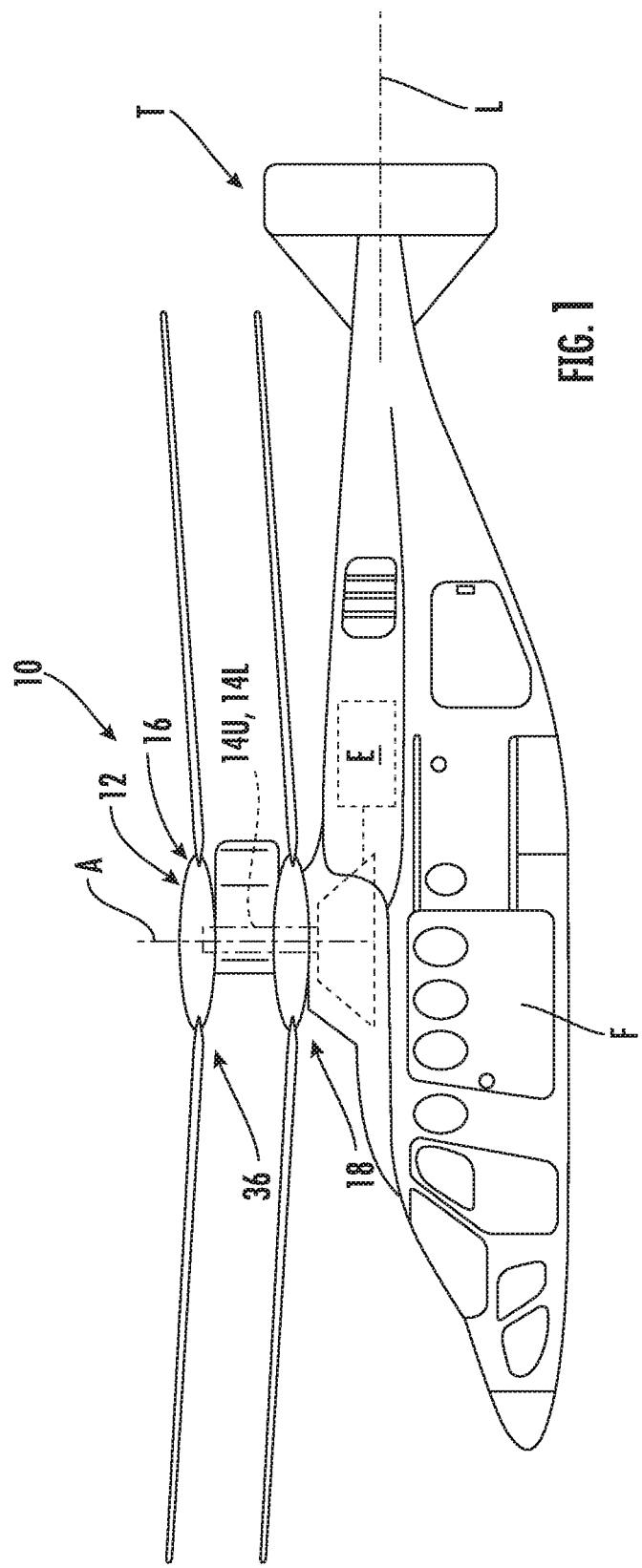
FIG. 1 is a general perspective side view of an exemplary rotary wing aircraft for use with the present invention.

FIG. 1 illustrates an exemplary vertical takeoff and landing (VTOL) rotary wing aircraft 10 having a dual, counter-rotating main rotor system 12, which rotates about a rotating upper main rotor shaft 14U, and a counter-rotating lower main rotor shaft 14L (FIGS. 1 and 2), both about an axis of rotation A. The aircraft 10 includes an airframe F which supports the dual, counter-rotating, coaxial main rotor system 12 as well as an optional translational thrust system T which provides translational thrust during high speed forward flight, generally parallel to an aircraft longitudinal axis L. Although a particular counter-rotating, coaxial rotor system aircraft configuration is illustrated in the disclosed embodiment, other rotor systems and other aircraft types such as tilt-wing and tilt-rotor aircrafts will also benefit from the present invention.

A main gearbox G (FIG. 2) located above the aircraft cabin drives the rotor system 12. The translational thrust system T may be driven by the same main gearbox G which drives the rotor system 12. The main gearbox G is driven by one or more engines (illustrated schematically at E in FIG. 2). As shown, the main gearbox G may be interposed between the gas turbine engines E, the rotor system 12, and the translational thrust system T.

Figure 2:
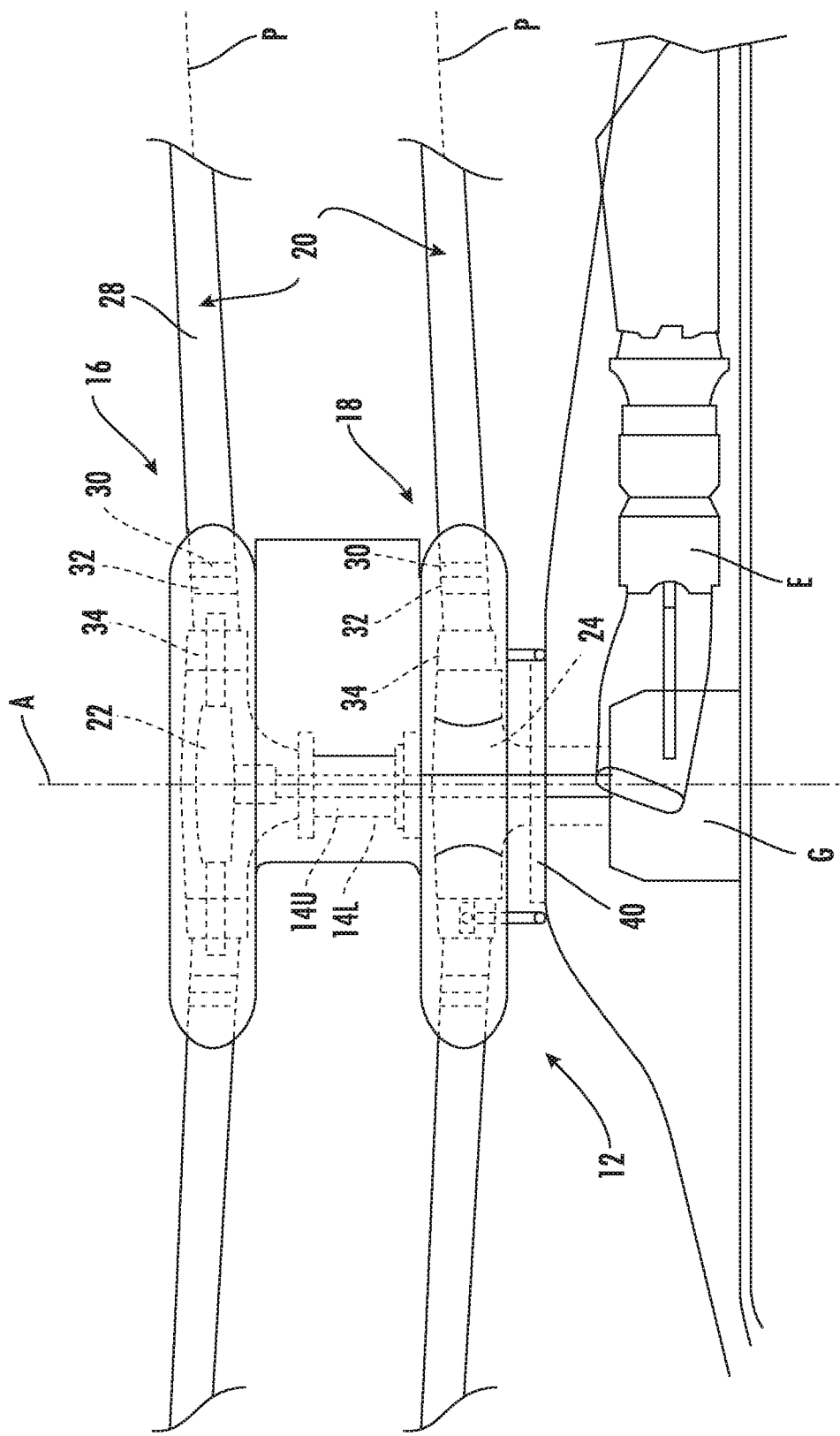
FIG. 2 is a detailed partial phantom view of a dual, counter-rotating, coaxial rotor system of the aircraft of FIG. 1.

Referring now to FIG. 2, the dual, counter-rotating, coaxial rotor system 12 includes an upper rotor system 16 and a lower rotor system 18. Each rotor system 16, 18 includes a plurality of rotor blade assemblies 20 mounted to a rotor hub assembly 22, 24 for rotation about the rotor axis of rotation A. The rotor hub assembly 22 is mounted to the upper rotor shaft 14U which counter rotates within the lower rotor shaft 14L, which rotates with the lower hub assembly 24.

The plurality of main rotor blade assemblies 20 project substantially radially outward from the hub assemblies 22, 24. Any number of main rotor blade assemblies 20 may be used with the rotor system 12. Each rotor blade assembly 20 of the rotor system 12 generally includes a rotor blade 28 (illustrated somewhat schematically), a rotor blade spindle 30, and a rotor blade bearing 32, which supports the rotor blade spindle 30 within a bearing housing 34 to permit the rotor blade 28 to pitch about a pitching axis P. It should be understood that various blade attachments may be utilized with the present invention.

Figure 3:
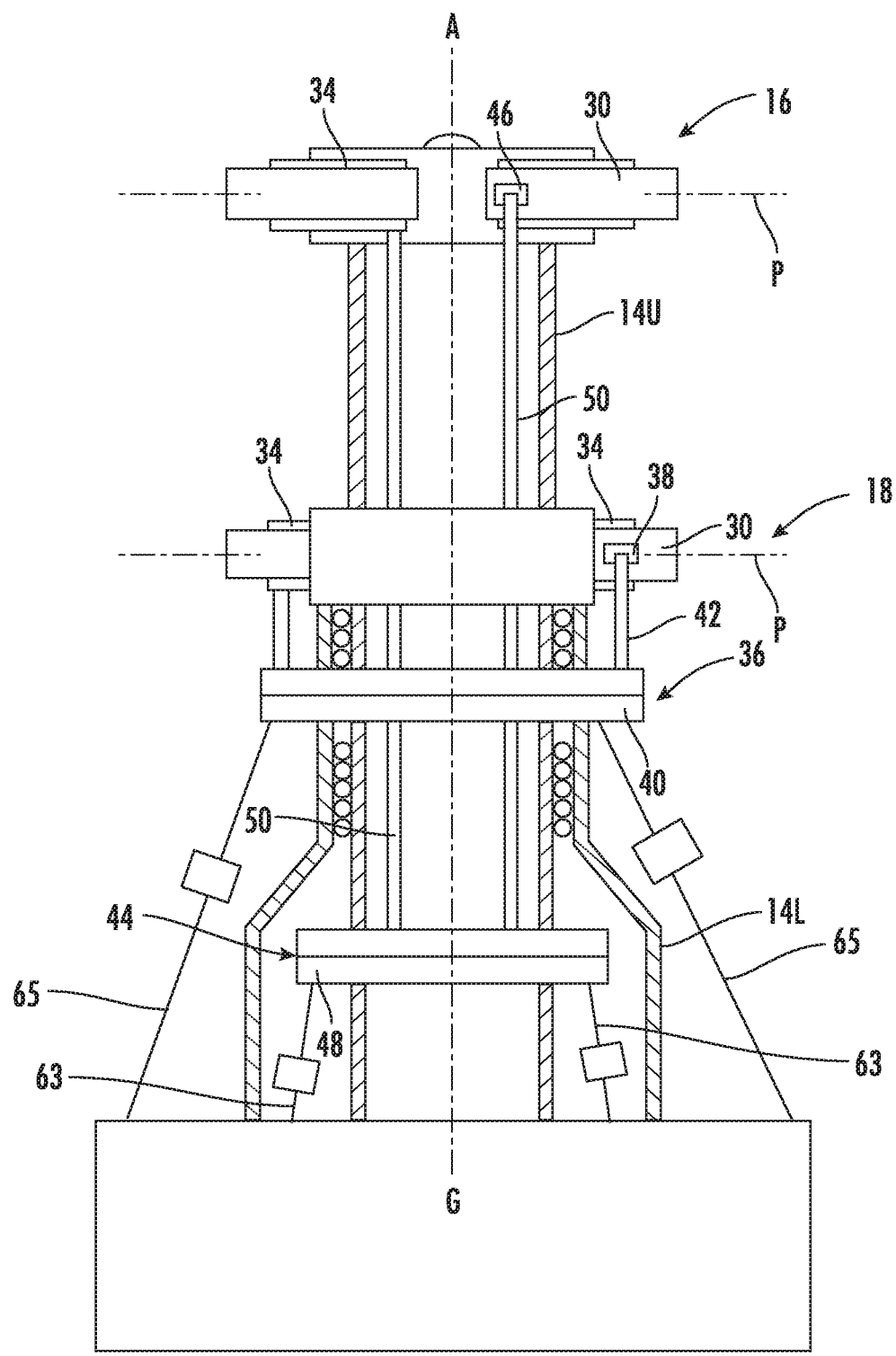
FIG. 3 is a schematic longitudinal sectional view of the dual, counter-rotating, coaxial rotor system in a flight position.

Referring to FIG. 3, a lower rotor control system 36 may include a rotor blade pitch control horn 38 mounted for rotation with the rotor blade spindle 30 of each lower rotor blade 28. Each lower rotor blade pitch control horn 38 is linked to a lower rotor swashplate 40 through pitch control rods 42. The lower rotor swashplate has two halves. One half rotates with the pitch control rods 42 while the other half is non-rotating and is linked to a lower rotor servo mechanism 65 to impart the desired pitch control thereto. Similarly, an upper rotor control system 44 includes rotor blade pitch control horn 46 mounted for rotation with the rotor blade spindle 30 of each upper rotor blade 28. The upper rotor blade pitch control horn 46 is linked to an upper rotor swashplate 48 through a pitch control rod 50. The upper rotor swashplate has two halves. One half rotates with the upper rotor pitch control rods 50 while the other half is non-rotating and is linked to upper rotor servo mechanism 63 to impart the desired pitch control thereto.

In such embodiments, each rotor control system 36, 44 is independently controlled through the separate swashplate assemblies 40, 48 which selectively articulate each rotor system 16, 18. Generally, motion of the swashplate assemblies 40, 48 along the rotor axis A will cause the rotor blades 28 of the respective rotor system 16, 18 to vary pitch collectively and tilting of the swash plate assemblies 40, 48 with respect to the axis A will cause the rotor blades 28 to vary pitch cyclically and tilt the rotor disk. The swashplate assemblies 40, 48 translate and/or tilt by separate servo mechanisms 65, 63. The rotor pushrods are in the rotor rotating reference system of the respective rotor while the servos are in the non-rotating reference system which selectively articulates each rotor system 16, 18 independently in both cyclic and collective in response to a rotor control system 36, 44. The rotor control systems 36, 44 preferably communicate with a flight control system which receives pilot inputs from controls such as a collective stick, cyclic stick, foot pedals and the like.

It should be understood that the pitch control rods and servo mechanisms 50, 63 for the upper rotor system 16 and a similarly for the lower rotor system 18 may be located internally or externally to the respective main rotor shaft 14U, 14L and that various pitch control rods, links and servo mechanisms at various locations for cyclic and collective pitch control of the rotor system 12 are contemplated herein.

Figure 4:
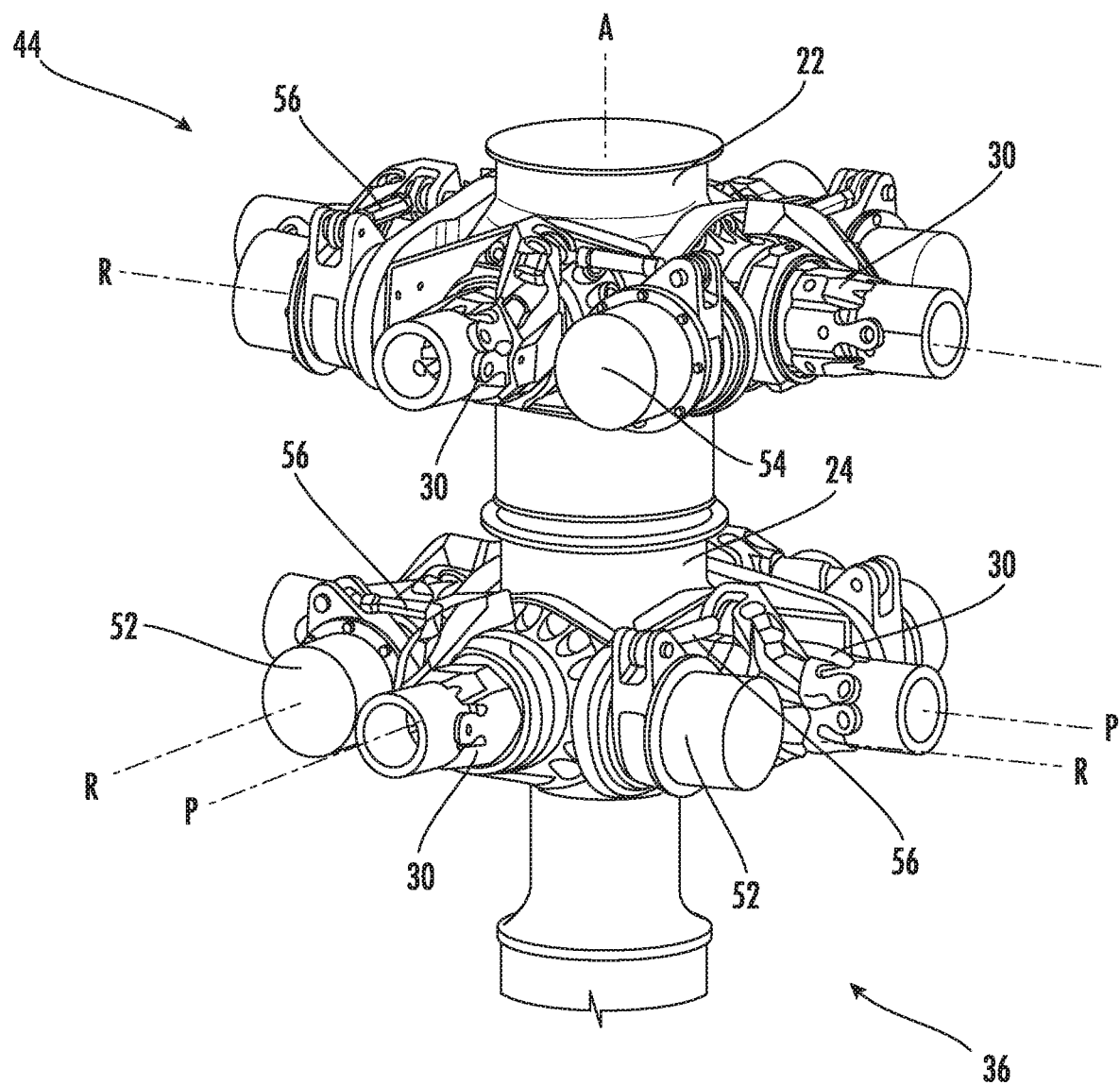
FIG. 4 is a perspective view of an exemplary upper and lower rotor control system according to an embodiment of the invention.

Alternatively, with reference to FIG. 4, the lower rotor control system 36 may be individual blade control (IBC) system including an electrical actuator 52 directly or indirectly coupled to the rotor blade spindle 30 of each lower rotor blade 28. Similarly, an upper rotor IBC system 44 includes an electrical actuator 54 coupled to the rotor blade spindle 30 of each upper rotor blade 28 (FIG. 2). The actuators 52, 54 are configured to impart a desired pitch control to the rotor blades 28. In the illustrated embodiment, each actuator 52, 54 is mounted to a respective rotor hub 22, 24 adjacent one of the plurality of rotor blade spindles 30 such that the actuators 52, 54 rotate about an axis R parallel and/or arranged approximately within the same plane as the axis P of an adjacent rotor blade 28. Rotation of each actuator 52, 54 is transferred to a corresponding rotor blade 28 through a linkage 56, such as a connector or gear chain for example. Although a particular IBC system configuration is illustrated in the disclosed embodiment, other IBC systems configurations, such as having actuators 52, 54 mounted concentrically with the rotor blade spindles 30 are within the scope of the invention. Other IBC systems such as having the actuators 52 mounted radially are within the scope of the invention.

The actuators or mechanisms, for example 65 and 63 or 52 and 54, of each rotor system 36, 44 may be independently controlled. However, the plurality of actuators within each rotor control system 36, 44 are commonly controlled together. In one embodiment, the actuators or mechanisms are used to similarly rotate the rotor blades 28 of each rotor system 16, 18, thereby varying the pitch at frequencies of multiples greater than one of the rotor rotational speed $\Omega$ with respect to axes P for vibration control. Additionally for primary control, the plurality of actuators or mechanisms within each rotor control system 36, 44 may be used to vary the pitch of the rotor blades 28 collectively at a frequency of zero and cyclically at a frequency of $\Omega$. The rotor control systems 36, 44 are configured to communicate with a flight control system (not shown) which receives pilot inputs from inceptors such as a collective stick, a cyclic stick, foot pedals, and the like, and upon which one or more vibration reducing commands are superimposed.

Figure 5:
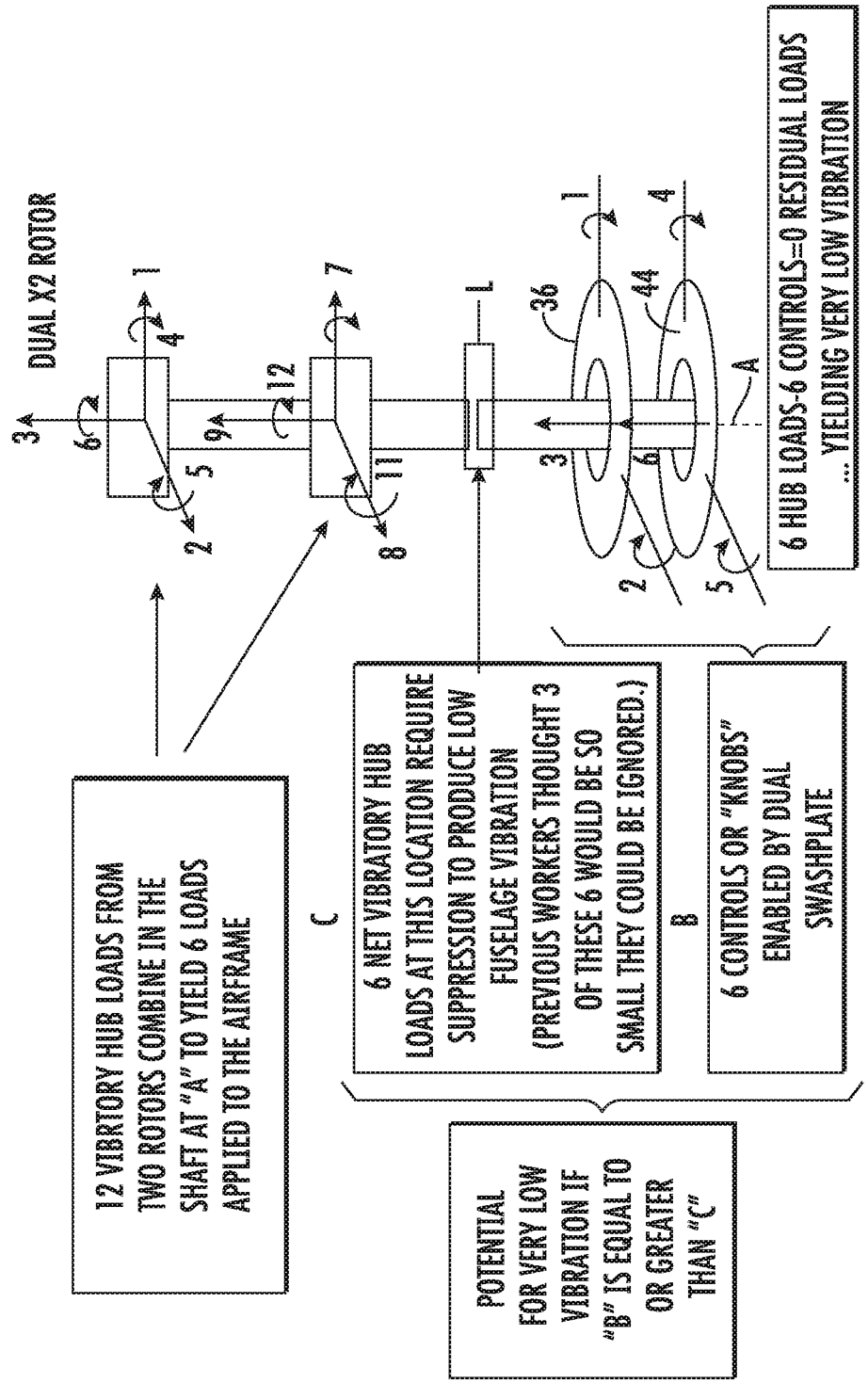
FIG. 5 is a block diagram of the forces, moments, and control loads available for Higher Harmonic Control (HHC) of a dual, counter-rotating, coaxial rotor system.

Referring to FIG. 5, the main rotor system 12 is mounted to the airframe F (FIG. 3) at a location L and vibrations thereto are transferred at location L. Each of the upper and lower rotor system 16, 18 generates six unique vibratory loads. The coaxial rotor system 12 thereby provides twelve vibratory hub loads. The twelve vibratory hub loads combine in the rotor system 12 to yield six loads applied to the airframe F at the location L. The two rotor systems 16, 18 do not produce the same set of three six-force patterns because of the difference in position of the two rotor systems 16, 18 i.e., they have different "leverage" with regard to location L and experience different aerodynamic environments. The six net vibratory hub loads at location L call for individual suppression to reduce airframe vibration.

The dual, counter-rotating, coaxial rotor system 12 enables individual control of the upper rotor system 16 and the lower rotor system 18. The lower rotor control system 36 provides up to three independent controls and the upper rotor control system 44 provides up to three independent controls. Together the two rotor systems 16, 18 can provide a total of six controls or "knobs" to reduce or theoretically eliminate air-frame vibration. In a dual, counter-rotating, coaxial rotor system 12, application of higher harmonic control to the two rotor systems 16, 18 which are located on the common axis A, may yield a substantial vibration reduction by suppressing the six loads.

Figure 6:
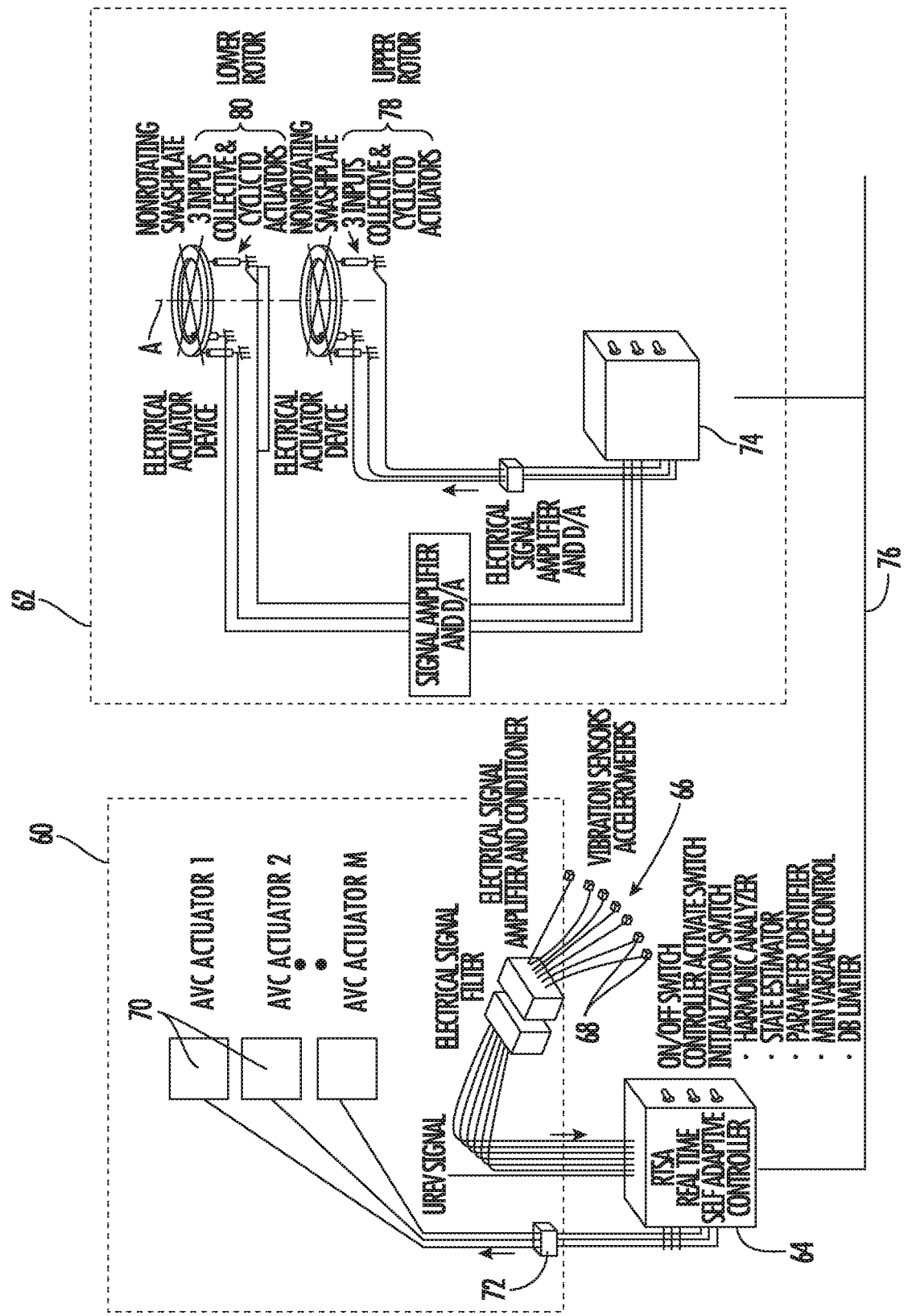
FIG. 6 is a schematic diagram of an Active Vibration Control (AVC) system and a HHC control system for a dual, counter-rotating, coaxial rotor system according to an embodiment.

In embodiments where the six controls cannot suppress the six vibratory hub loads at location L, an active vibration control (AVC) system 60 may be used in combination with the HHC system 62 to minimize the vibration in the airframe F. With reference now to FIG. 6, a schematic diagram of an AVC system and a higher harmonic control (HHC) system for reducing the vibrations experienced by the aircraft due to the rotating main rotor assembly 12 is illustrated.

As shown, the aircraft 10 includes a controller 64, such as a real time self adaptive (RTSA) controller for example, and a sensor system 66 including a plurality of sensors 68 mounted about the aircraft 10. It should be understood that various types of sensors 68 arranged at various locations are contemplated herein. In an embodiment, the sensors 68 are mounted in the cockpit or in areas where crew or other passengers are located. The sensors 68 may be accelerometers configured to generate signals representative of dynamic changes at selected locations of the aircraft 10 as the main rotor assembly 12 operates. The controller 64 is arranged in communication with the sensor system 66 to sense vibration within the airframe F.

The AVC system 60 includes one or more force generators 70 mounted about the fuselage F or at any suitable location of the aircraft 10. The plurality of force generators 70 are coupled to a power source (not shown) such as an electric motor, air motor, hydraulic motor, or turbine for example, and is arranged in communication by means of electrical or wireless communication links 72 with the controller 64. In response to the sensor data, the controller 64 is configured to output signals to the force generators 70 by means of the electrical or wireless communications links 72 to control phase and/or magnitude characteristics of the force generators 70. Operation of the force generators 70 is continuously varied by the controller 64 to correspond to changing dynamic characteristics of the aircraft to reduce or eliminate the vibratory forces experienced by the aircraft 10.

The HHC system 62 generally includes a HHC-controller 74 arranged in communication with the AVC-controller 64. In some embodiments, the controller 74 includes a plurality of computers, for example three computers that provide triplex redundancy for flight critical components, such as the rotor control systems 36, 44 for example. In the illustrated, non-limiting embodiment, the one or more computers within 74 are operably coupled to the controller 64 via a communication bus 76. However, embodiments where the controller 64 and the one or more computers within 74 are integrated are also within the scope of the disclosure, it should be understood that in the event that the communication between the controller 64 and the computers within 74 is lost, the controller 64 is capable of operating the AVC system 60 to maximize a reduction in the vibration of the aircraft 10 using only the force generators 70. In normal operation, the AVC-controller 64 sends commands to both the AVC actuators 70 and the HHC-actuators 80, 78 to minimize vibration.

Each of the one or more computers 74 are additionally arranged in communication with an upper HHC actuator system 78 and a lower HHC actuator system 80 which are operable to implement a higher harmonic blade pitch to the upper and lower rotor systems 16, 18. The computers within 74 may provide closed loop control of the upper actuator system 78 and of the lower actuator system 80 individually to minimize vibration of the rotor system 12 in accordance with an HHC algorithm executed by the controller 64.

In the illustrated, non-limiting embodiment of FIG. 6, the upper HHC actuator system 78 and the lower HHC actuator system 80 each includes a plurality of actuators, such as three lower rotor actuators 65 and three upper rotor actuators 63 of FIG. 3 for example, configured to cooperate to provide a net longitudinal input, lateral input, and collective input. It should be understood that the upper rotor control system 44 and the lower rotor control system 36 are generally overlaid or integrated with the pilot inputs with the HHC actuator system 78 and the lower HHC actuator system 80. In embodiments where the upper and lower rotor control systems 44, 36 include independent blade control, the upper rotor control system 44 and the lower rotor control system 36 may be overlaid or integrated with the pilot inputs with the plurality of actuators 52, 54. It should be understood that various actuator systems may be utilized with the present invention so long as active control is provided individually in each axis of both the upper and lower rotor system 16, 18.

During operation of the aircraft 10, the vibratory forces arising from operation of the main rotor assembly 12 and/or the tail rotor assembly 16 are transmitted to the fuselage F. In response to the vibrations sensed by the plurality of sensors 68 of the sensor system 66, the controller 64 determines a position of each actuator of the upper HHC actuator system 78, the lower HHC actuator system 80 and the AVC actuators 70 to maximize a reduction in the vibratory loads. The controller 64 communicates these positions to the AVC actuators 70 and to the one or more computers within 74. The controller 74 validates the received commands and then operates the upper and lower HHC actuator systems 78, 80 accordingly to achieve the corresponding positions. The controller 64 communicates these commands by means of at least one electrical or wireless link 72 for implementation at one or more desired force generator 70 of the AVC system 60. Although the AVC system 60 and the HHC system 72 are illustrated and described as working in combination to reduce the vibration of the aircraft 10, it should be understood that in some embodiments, the HHC system 62 may be operable to yield essentially complete vibration reduction, and in other embodiments, the AVC system 60 may be operable to yield essentially complete vibration reduction.

An aircraft 10 having a vibration reducing system including both a higher harmonic control system 62 and an active vibration control system 60 is able to achieve virtual elimination of all of the vibratory loads of the aircraft 10, thereby improving the ride quality for the crew and reducing equipment fatigue. In addition, by using the active vibration control system 60 in combination with the higher harmonic control system 62, the number and size of force generators 70, and therefore the total weight of the active vibration control system 60 may be reduced compared to conventional active vibration control system tasked with performing the entire vibration control operation.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotary wing aircraft comprising:
a rotor system rotatable about an axis relative to an airframe;
a plurality of blade assemblies mounted to the rotor system;
a higher harmonic control system including at least one computer operably coupled to at least one actuator, the at least one computer being operable to adjust a position of the at least one actuator to implement a higher harmonic blade pitch at the rotor system according to a higher harmonic control signal;
an active vibration control system including at least one active vibration control actuator mounted to the airframe, the active vibration control system being operable to generate vibration forces about the airframe of the aircraft according to an active vibration control signal; and
a controller operably coupled to the at least one active vibration control actuator and to the at least one computer, the controller being operable to selectively communicate the higher harmonic control signal to the at least one computer and communicate the active vibration control signal to the at least one active vibration control actuator to coordinate operation of the higher harmonic control system and the active vibration control system to reduce vibration within the airframe.

2. The rotary wing aircraft of claim 1, wherein the at least one computer includes a plurality of computers for providing redundancy.

3. The rotary-wing aircraft according to claim 1, wherein the at least one computer provides closed loop control of the at least one actuator.

4. The rotary wing aircraft of claim 1, wherein the active vibration control system includes an electrical or wireless link coupled to at least one force generator, the link being operable to control at least one of phase and magnitude characteristics of the at least one force generator in response to the active vibration control signal from the controller.

5. A rotary wing aircraft comprising:
   a rotor system rotatable about an axis relative to an airframe;
   a plurality of blade assemblies mounted to the rotor system;
   an actuator system including a plurality of individually controllable actuators movably coupled to the plurality of blade assemblies in an X-Y-Z axis, the plurality of individually controllable actuators being operable to adjust a pitch of the plurality of blade assemblies to implement higher harmonic blade pitch to the rotor system;
   at least one force generator mounted about the aircraft;
   a sensor system within the airframe which senses vibration;
   a controller arranged in communication with the sensor system, wherein the controller identifies a commanded position of each of the plurality of individual controllable actuators and a commanded position of the at least one force generator in response to the sensed vibration from the sensor system such that the actuator system and the at least one force generator in combination reduce vibration within the airframe.

6. The system of claim 5, wherein the rotor system further comprises a swashplate and the actuator system further comprises a plurality of actuators that control the fore-aft, left-right, and up-down movement of said swashplate, the controller being operable to generate commands for at least one of the actuators to control the movement of the swashplate to reduce vibration within the airframe.

7. The system of claim 5, wherein the actuator system further comprises a plurality of actuators, each actuator being associated with one of the plurality of blade assemblies and being operable to independently control movement of a coupled blade assembly about a pitch axis, the controller being operable to generate commands for at least one of the actuators to control movement of at least one blade assembly to reduce vibration within the airframe.

8. The rotary-wing aircraft according to claim 5, wherein the rotor system comprises a dual, counter-rotating, coaxial rotor system having an upper rotor system and a lower rotor system rotatable about a common axis relative to an airframe.

9. The rotary-wing aircraft according to claim 8, wherein the actuator system includes a plurality of individually controllable actuators associated with the upper rotor system and a plurality of individually controllable actuators associated with the lower rotor system.

10. The rotary-wing aircraft according to claim 8, wherein the upper rotor system and the lower rotor system each generate six unique vibratory loads such that the counter-rotating, coaxial rotor system generates twelve vibratory hub loads, and the twelve vibratory hub loads combine in the counter-rotating, coaxial rotor system to yield six net vibratory loads applied to the airframe, and the at least one computer individually controls at least one actuator coupled to the upper rotor system and at least one actuator coupled to the lower rotor system to reduce the six net vibratory loads.

11. A method of reducing vibration in a rotary wing aircraft airframe having a rotor system rotatable about an axis of rotation comprising:
   sensing vibrations of the airframe;
   determining a higher harmonic control signal and an active vibration control signal to reduce vibration of the aircraft in response to the sensed vibrations;
   individually controlling at least one actuator, via a computer, to adjust a position of the rotor system in an X-Y-Z axis to implement a higher harmonic blade pitch to the rotor system in response to the higher harmonic control signal; and
   controlling at least one force generator mounted about the airframe in response to the active vibration control signal.

12. The method of claim 11, wherein the rotor system is a dual, counter-rotating, coaxial rotor system having an upper rotor system and a lower rotor system rotatable about a common axis of rotation.

13. The method of claim 12, wherein individually controlling at least one actuator to adjust the position of the rotor system in an X-Y-Z axis includes:
   individually controlling at least one individually controllable actuator in each axis to control an upper swashplate and control an upper rotor system in said X-Y-Z axis with an upper higher harmonic control actuator system to reduce vibration within an airframe of the aircraft; and
   individually controlling a lower higher harmonic control actuator system which includes at least one individually controllable actuator in each axis to control a lower swashplate and control a lower rotor system in said X-Y-Z axis: with a lower higher harmonic control actuator system to reduce vibration within the airframe of the aircraft.

14. The method of claim 12, wherein individually controlling at least one actuator to adjust the position of the rotor system in an X-Y-Z axis includes:
   individually controlling at least one actuator of a plurality of actuators, each of which is coupled to a blade assembly of the upper rotor system to control the upper rotor system in an X-Y-Z axis and to reduce vibration within an airframe of the aircraft; and
   individually controlling at least one actuator of a plurality of actuators, each of which is coupled to a blade assembly of the lower rotor system to control the lower rotor system in an X-Y-Z axis and to reduce vibration within an airframe of the aircraft.

* * * * *